(12) United States Patent
Jung et al.

(10) Patent No.: US 8,562,485 B2
(45) Date of Patent: Oct. 22, 2013

(54) METHOD FOR MONITORING THE OPERATION OF A DRIVE TRAIN

(75) Inventors: Mario Jung, Eichenweg (DE); Bjoern Stehle, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/526,084

(22) Filed: Jun. 18, 2012

(65) Prior Publication Data

US 2012/0252629 A1 Oct. 4, 2012

Related U.S. Application Data

(63) Continuation of application No. PCT/DE2010/001457, filed on Dec. 13, 2010.

(30) Foreign Application Priority Data

Dec. 21, 2009 (DE) .......................... 10 2009 059 726

(51) Int. Cl.
*F16H 59/74* (2006.01)
(52) U.S. Cl.
USPC .......................................... 477/105; 477/906
(58) Field of Classification Search
USPC ......... 477/101, 107, 111, 112, 115, 125, 906; 701/62, 63
See application file for complete search history.

(56) References Cited

U.S. PATENT DOCUMENTS

| 4,833,613 | A | * | 5/1989 | Mack et al. | ...................... 701/51 |
| 4,849,899 | A | * | 7/1989 | Cote et al. | ...................... 701/63 |
| RE42,464 | E | * | 6/2011 | Nada | .......................... 701/30.6 |
| 2009/0227420 | A1 | * | 9/2009 | Jess et al. | ..................... 477/101 |

FOREIGN PATENT DOCUMENTS

| DE | 3934974 | 2/1991 |
| DE | 102007021871 | 2/2008 |
| DE | 102007042724 | 3/2009 |

* cited by examiner

*Primary Examiner* — Justin Holmes
(74) *Attorney, Agent, or Firm* — Simpson & Simpson, PLLC

(57) ABSTRACT

A method for monitoring the operation of a drive train of a motor vehicle, the drive train including a drive machine, a clutch and an automated transmission, and the drive train having an emergency program, which enables an emergency operation of the drive train even if important control signals such as engine torque, engine speed, transmission speed are missing, where the emergency operation is initiated as soon as one of the following signals is no longer present: engine torque or a substitute value for the engine torque, torque requested by a driver or a substitute for the torque requested by the driver, engine speed, transmission input speed.

12 Claims, No Drawings

METHOD FOR MONITORING THE OPERATION OF A DRIVE TRAIN

CROSS-REFERENCE TO RELATED APPLICATIONS

This application is filed under 35 U.S.C.§120 and §365(c) as a continuation of International Patent Application No. PCT/DE2010/001457 filed Dec. 13, 2010, which application claims priority from German Patent Application No. 10 2009 059 726.3 filed Dec. 21, 2009, which applications are incorporated herein by reference in their entireties.

FIELD OF THE INVENTION

The invention relates to a method for monitoring the operation of a drive train of a motor vehicle, the drive train including a drive machine, a clutch and an automated transmission, and the drive train having an emergency program, which enables emergency operation of the drive train, even if important control signals such as engine torque, engine speed, transmission speed are missing.

BACKGROUND OF THE INVENTION

The drive machine is, for example, an internal combustion engine also known as an engine. A method for monitoring the operation of a drive train of a motor vehicle in which at least an emergency program is provided, where the input signals are checked for the presence and/or plausibility is disclosed in the German Patent No. 10 2007 021 871 A1. The emergency program is activated as soon as a signaling error is detected. The function of the emergency program is monitored and an error management procedure is initiated as soon as an error in the function of the emergency program is detected.

BRIEF SUMMARY OF THE INVENTION

One object of the invention is to enable emergency operation of a motor vehicle having a drive train, the drive train comprising a drive machine, a clutch and an automated transmission, even if important control signals such as engine torque, engine speed, transmission speed are missing.

Another object of the invention is to provide a method for monitoring the operation of a drive train of a motor vehicle, the drive including a drive machine, a clutch and an automated transmission, and the drive train having an emergency program. The emergency program enables the emergency operation of the drive train, even if important control signals such as engine torque, engine speed, transmission speed are missing in that the emergency operation is initiated as soon as one of the following signals is no longer present: engine torque or a substitute value for the engine torque, torque requested by the driver or a substitute value for the torque requested by the driver, engine speed, or transmission input speed. The automated transmission is, for example, based on a manual transmission and uses essentially similar technologies. The automated transmission includes, for instance, an electronic clutch management and can be designed as an automated gearbox, uninterruptible gearbox, parallel gearbox, or an electrical gearbox. The automated transmission is preferably designed as a parallel gearbox. A parallel gearbox is a dual clutch transmission variant in a layshaft design having cylindrical gear toothing and a synchronized claw-shifted gearbox with electromechanical transmission actuation and Active Interlock. The gears are shifted automatically in an automated transmission. As soon as one of the mentioned signals is no longer present, the clutch torque can no longer be calculated and the emergency operation is activated. Instead of the engine torque, a replacement value can be calculated based on the throttle angle. If the signal torque requested by the driver is missing, a replacement value based on the pedal reading can alternatively be calculated. The absence of the engine torque normally results in the breakdown of the motor vehicle. In the unlikely event that the engine speed is still present for the engine control but not for the transmission control, the emergency operation can be activated. The transmission input speed is either determined by means of a sensor or based on the transmission output speed, if a corresponding sensor is present, or calculated from the wheel rotation speed. The emergency operation can always be activated if the transmission input speed can no longer be calculated, for example, in the event of the complete failure of the ABS control device which is used to provide the wheel rotation speed.

In one embodiment, the method provides the emergency operation is stopped as soon as all of the signals mentioned above are present again and an ignition phase has been completed. After the ignition phase is complete, the motor vehicle can be operated normally again.

In another embodiment, the method provides that the emergency operation is stopped as soon as all signals mentioned above are present again and the driving situation is safe.

The presence of a safe driving situation is assumed if the clutch is completely engaged, the transmission is in a neutral position or the motor vehicle is standing still, the clutch is disengaged and the break depressed.

In yet another embodiment, the method provides that the emergency operation is only initiated if a signal for the pedal reading and a signal for the speed or transmission input speed are present. The clutch may only be engaged if a driver has been recognized. The signal from the pedal reading is suitable for this purpose.

In another embodiment, the method provides that the emergency operation initiated in spite of the fact that none of the signals for the pedal reading, speed or transmission input speed are present remains limited to a first gear and a reverse gear. No gear shifting maneuvers are required in connection with this limitation.

In yet another embodiment, the method provides that the engagement of the clutch in the emergency operation is exclusively made dependent on the pedal reading. This has the advantage that starting on a hill is easier even though important engine signals are missing in the emergency operation.

In another embodiment, the method provides that an overspeed protection in the emergency operation is made dependent on the transmission input speed or at least a wheel rotation speed. Depending on the available sensors, a simple overspeed protection can be realized in different ways.

In yet another embodiment, the method provides that a driver of the motor vehicle is forced to release the gas pedal for shifting gears in the emergency operation. When the driver releases the gas pedal, the clutch is preferably disengaged. As soon as the driver pushes the gas pedal down again, the clutch, preferably an additional clutch of a dual clutch arrangement, is engaged.

In another embodiment, the method provides that the clutch is not engaged when the gas pedal is depressed if the driver pushes the gas pedal before the engagement of a gear in the emergency operation is complete, but only when the gear is completely engaged. In some instances, this may result in undesirable engine revving, which is however acceptable in the emergency operation.

Other advantages, characteristics and details of the invention can be derived from the description below in which various exemplary embodiments are described extensively.

DETAILED DESCRIPTION OF THE INVENTION

At the outset, while the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The invention relates to methods for monitoring or to control strategies for drive drains of motor vehicles with automated transmissions. The method is aimed at enabling an emergency operation of a motor vehicle having the type of drive train even if important control signals such as engine torque, engine speed, transmission input speed, and torque requested by the driver are missing. In the emergency operation, it should be possible to drive the motor vehicle with few signals. In the process, a special focus is on the shifting of the gears, which takes place automatically in automated transmissions.

The emergency operation is initiated as soon as one of the signals for engine torque, torque requested by the driver, engine speed, or transmission input speed is no longer present. All of these signals are required for a normal strategy to calculate the clutch torque. As soon as one of the signals is no longer present, the clutch torque can no longer be calculated and the emergency operation is activated.

Two strategies are proposed for stopping the emergency operation. According to a first strategy, the emergency operation is stopped as soon as all signals are present again and determined to be working properly and an ignition phase has been completed. According to a second strategy, the emergency operation is stopped as soon as all signals are present again and determined to be working properly and the driving situation is safe. A safe driving situation is, for example, given if the clutch is fully engaged, the transmission is in neutral position or the motor vehicle is standing still, the clutch is disengaged and the brake depressed.

In the active emergency operation, the signals of the pedal reading (driver recognition) and speed or transmission input speed (overspeed protection) are required. The clutch may only be engaged if a driver has been recognized. The signal of the pedal reading is suitable for this purpose. If the pedal reading equals zero, the pedal is not engaged. If the pedal reading equals one hundred, the pedal is fully engaged. If the pedal reading is greater than a limit of, for example, 10 percent, it will be deemed recognized as a driver.

In one embodiment, the engagement of the clutch in the emergency operation is exclusively made dependent on the pedal reading. This has the advantage that starting on a hill is easier even if important engine signals are missing in the emergency operation. The driver controls the motor vehicle, for example, by engaging the foot brake with the left foot and the gas pedal with the right foot, thus engaging the clutch. As soon as the driver feels that the clutch is engaging, he releases the foot brake.

Obviously, it is also possible to control the motor vehicle on a hill by means of the hand brake and by releasing it when the vehicle starts moving. Both methods are ultimately possible and it is at the discretion of the vehicle manufacturer to decide which strategy is being pursued.

Depending on the available sensors, a simple overspeed protection can be realized as follows. The current transmission speed can be determined as a sensor signal by means of a transmission input sensor. Using the known transmission conditions, the speed of the new gear speed can be calculated with the tip minus function. If the speed exceeds a limit, the tip minus function will be rejected.

Alternatively or additionally, the speed of the motor vehicle can be estimated using a wheel rotation speed. The tip minus function is only accepted if the speed is lower than a . gear-dependent limit.

If none of these signals are present, the emergency operation may still be possible. In this case, however, the emergency operation is limited to the first gear and the reverse gear, meaning that no gear shifting maneuvers are required. In this case, emergency operation can only be selected, for example, with the gear selector position P when the engine is turned off. In addition, it makes sense to remain in this status for a minimum amount of time in order to secure that the condition vehicle is standing still.

In this case, there is a residual risk that the motor vehicle will roll downhill and the speed will therefore become faster due to the disengaged clutch than the maximum speed for the first gear or the reverse gear. When putting the clutch in, the engine speed should therefore be observed and the clutch engaged immediately as soon as an engine speed limit is exceeded. In this case, the gears should be disengaged immediately. Then, the re-initiation of the emergency operation is only possible if the conditions mentioned above are met (gear selector position P, engine off, time requirement).

If neither the engine speed nor the vehicle speed/transmission input speed/transmission output speed is present, the emergency operation cannot be initiated for safety reasons.

If one of the two signals vehicle speed/gear is still present, it makes sense to influence the steepness of the clutch torque gradients depending on these signals. The higher the gear is, the steeper the gradient should be. The higher the speed is, the steeper the gradient should be. This is based on the rationale that a fast engagement of the clutch makes sense in connection with high gears/speeds.

In the active emergency operation, the driver selects the drive position when starting the vehicle. The first gear and the second gear are engaged. When the gas pedal is activated, the clutch of the first gear engages in a gradient-like fashion while the clutch of the second gear remains disengaged. The steepness of the gradient can be dependent on a plurality of signals. To start the vehicle, the dependence on the pedal reading is preferable. The clutch torque gradient is all the steeper the higher the pedal reading is. This means that the clutch is put in fast when the gas pedal is depressed more. Generally, the dependence on the speed or gear makes sense, but not for starting the vehicle.

When the vehicle is stopped, the clutch is disengaged as soon as the driver releases the gas pedal, meaning that there is no coasting.

When shifting or changing gears, the driver needs to check first whether or not the continuous operation mode or D mode is possible at all. In D mode, the transmission control decides when a gear shift should take place based on a plurality of signals. Speed signals from the transmission are required for this purpose. If a rotational speed proportional to the driving speed is present, the vehicle can be operated in automatic or manual mode. If this parameter is not present, the vehicle may only be driven in first gear and in reverse gear.

Crossover gear shifting commonly used in dual clutch transmissions, in which the clutch torque is transmitted from one clutch to the other without interrupting the pull, is not possible in emergency operation, because the engine torque and the torque requested by the driver are required for its coordinated and safe operation.

Corrective action involving the engine is not possible in case of an emergency. Even if corrective action involving the engine would be possible based on the signal flow and availability of an engine interface, it is impossible based on the transmission control to calculate the target engine torque because the signals required for this purpose are missing. Consequently, no regulated or controlled automatic engaging and releasing of the clutch when shifting gears is possible in M mode either.

In another embodiment, the driver is required to release the gas pedal for shifting gears in the emergency operation. For instance, if the driver is operating the vehicle in the second gear and wishes to shift to third gear, the driver releases the gas pedal. The clutch disengages—that is, the disengagement of the clutch is achieved with the signal gas pedal equals. zero percent. If the driver activates the tip plus function, the correct gear is engaged in the other sub-transmission, unless this has already happened. As soon as the driver presses the gas pedal down again, the other/new sub-clutch or clutch is engaged per gradient. The steepness of the gradient can be dependent on the pedal reading, gear and speed, where the pedal reading and speed are preferable. The gradient is steeper the higher the speed and pedal reading are.

In yet another embodiment, the driver is already pushes down the gas pedal before the engagement of the gear is complete. In this case, the clutch is not engaged when the gas pedal is operated, but only when the gear has been fully engaged. This can indeed result in undesirable engine revving which is, however, acceptable in emergency operation.

With the tip plus/minus function, the clutch is disengaged by means of tip plus/minus. The driver keeps the gas pedal depressed while activating tip plus/minus. The clutch is disengaged based on the recognition of the tip plus/minus function. The engine speed is high and the driver may or may not release the gas pedal. A new gear can be engaged. The clutch can be engaged or the corrective action involving the engine can be stopped again.

What is claimed is:

1. A method for monitoring the operation of a drive train of a motor vehicle, the drive train comprising a drive machine, a clutch and an automated transmission, and the drive train having an emergency program:
    determining that a control signal selected from the group consisting of engine torque, a substitute value for engine torque, torque requested by a driver, a substitute for torque requested by a driver, engine speed, and transmission input speed is missing;
    losing ability to calculate clutch torque under a normal strategy; and,
    initiating emergency operation of the drive train by enabling engagement of the clutch.

2. The method as recited in claim 1, further comprising:
    stopping the emergency operation as soon as all the signals are present again and an ignition phase has been completed.

3. The method as recited in claim 1, further comprising:
    stopping the emergency operation as soon as all the signals are present again and a safe driving situation is present.

4. The method as recited in claim 3, wherein the presence of a safe driving situation is assumed if the clutch is fully engaged, the transmission is in a neutral position or the motor vehicle is standing still, the clutch is disengaged and the brake depressed.

5. The method as recited in claim 1, further comprising:
    initiating the emergency operation only if a signal for the pedal reading and a signal for the speed or transmission input speed are present.

6. The method as recited in claim 5, further comprising:
    initiating the emergency operation in the absence of signals for pedal reading, speed or transmission input speed; and,
    limiting emergency operation to a first gear and a reverse gear.

7. The method as recited in claim 1, further comprising:
    making the engagement of the clutch in emergency operation exclusively dependent on the pedal reading.

8. The method as recited in claim 1, further comprising:
    making an overspeed protection in emergency operation dependent on the transmission input speed or at least a wheel rotation speed.

9. The method as recited in claim 1, further comprising:
    requiring a driver of the motor vehicle to release the gas pedal to shift gears in emergency operation.

10. The method as recited in claim 9, further comprising:
    not engaging the clutch when the gas pedal is depressed if the driver presses the gas pedal before the engagement of a gear in emergency operation is complete, but only when the gear is fully engaged.

11. A method for monitoring the operation of a drive train of a motor vehicle, the drive train comprising a drive machine, a clutch and an automated transmission, and the drive train having an emergency program:
    determining that a control signal selected from the group consisting of engine torque, a substitute value for engine torque, torque requested by a driver, a substitute for torque requested by a driver, engine speed, and transmission input speed is missing;
    receiving a first signal from a brake or gas pedal and a second signal for a speed or transmission input speed; and,
    initiating emergency operation of the drive train by enabling engagement of the clutch.

12. A method for monitoring the operation of a drive train of a motor vehicle, the drive train comprising a drive machine, a clutch and an automated transmission, and the drive train having an emergency program:
    determining that a control signal selected from the group consisting of engine torque, a substitute value for engine torque, torque requested by a driver, a substitute for torque requested by a driver, engine speed, and transmission input speed is missing; and
    initiating emergency operation of the drive train by enabling engagement of the clutch, wherein:
    the emergency operation is limited to operation in a lowest forward gear for the automated transmission and a reverse gear for the automated transmission.

* * * * *